United States Patent
Yamada

(10) Patent No.: US 6,907,180 B2
(45) Date of Patent: Jun. 14, 2005

(54) OPTICAL FIBER ARRAY AND METHOD FOR ITS MANUFACTURE

(75) Inventor: Atsushi Yamada, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/660,766

(22) Filed: Sep. 12, 2003

(65) Prior Publication Data

US 2004/0126078 A1 Jul. 1, 2004

(30) Foreign Application Priority Data

Sep. 20, 2002 (JP) .................................... 2002-274871

(51) Int. Cl.⁷ ................................................. G02B 6/00
(52) U.S. Cl. ...................................................... 385/137
(58) Field of Search ......................................... 385/137

(56) References Cited

U.S. PATENT DOCUMENTS 6,368,441 B1    4/2002    Yamada ..................... 156/178

FOREIGN PATENT DOCUMENTS

| EP | 0 737 876 A | 10/1996 |
| EP | 0 996 008 A | 4/2000 |
| JP | 56-021109 | 2/1981 |
| JP | 5-307129 | 11/1993 |
| JP | 6-11625 | 1/1994 |
| JP | 9-90105 | 4/1997 |
| JP | 11-242127 | 9/1999 |
| JP | 11-326704 | 11/1999 |
| JP | 2000-193844 | 7/2000 |
| JP | 2000-275465 | 10/2000 |
| JP | 2000-329971 | 11/2000 |

*Primary Examiner*—Javaid H. Nasri
(74) *Attorney, Agent, or Firm*—Armstrong, Kratz, Quintos, Hanson & Brooks, LLP

(57) ABSTRACT

An optical fiber array having a plurality of optical-fiber bare fibers disposed in alignment between two opposing plate members, which is characterized in that optical-fiber bare fibers 5 are disposed in contact with a flat surface of a plate member A, an adjustment layer 7 is interposed between another plate member B and the plate member A, where the back of the plate member B is made to serves as a disposition standard surface 3, and the adjustment layer, which fulfills conditions of $(d_{max}+r)<H$ where the desired preset distance from i) a central line of the optical-fiber bare fibers which is formed by connecting central points of end cross sections in the optical-fiber bare fibers disposed in alignment to ii) the disposition standard surface is represented by H, the maximum value of the thickness dimension in the plate member B by $d_{max}$, and the radius of the optical-fiber bare fibers by r, compensates a deviation from the preset distance H that is caused by a non-uniformity in thickness dimension in the plate member B, whereby the distance from the central points of the optical-fiber bare fibers to the disposition standard surface is set identical or substantially identical to the preset distance H.

8 Claims, 12 Drawing Sheets

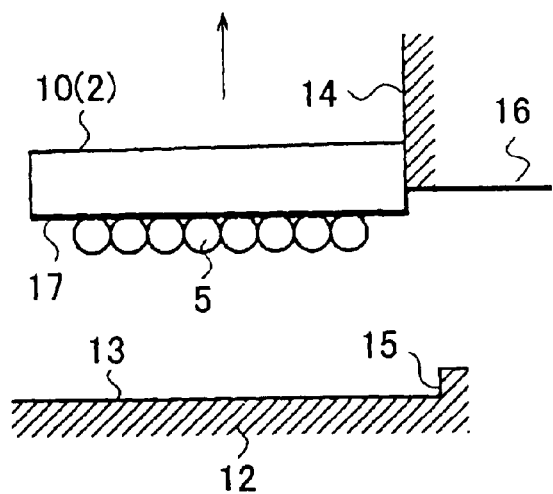
FIG.3A
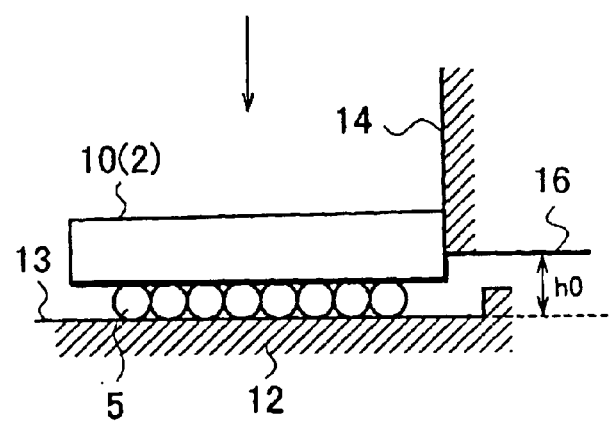
FIG.3B
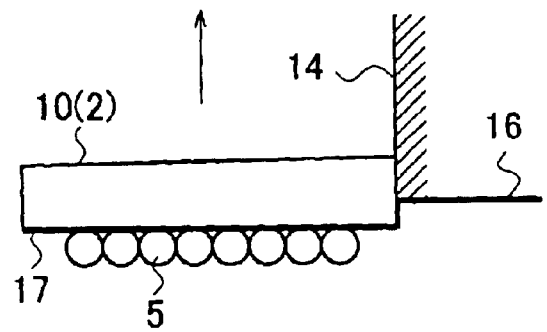
FIG.3C
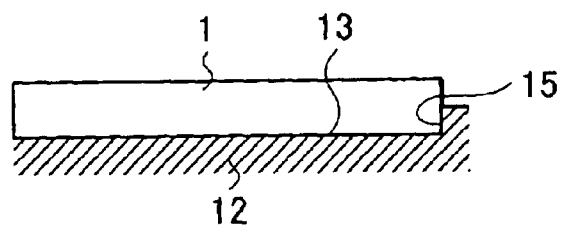

OPTICAL FIBER ARRAY AND METHOD FOR ITS MANUFACTURE

BACKGROUND OF THE INVENTION

1. Field of the Invention

This invention relates to an optical fiber array comprising a plurality of optical-fiber bare fibers which are disposed in alignment between two opposing plate members and are optically connected to connection elements (e.g., optical fiber lines, optical waveguide lines or optical elements on optical circuit boards) in an end-to-end facing arrangement with each other. More particularly, this invention relates to an optical fiber array which facilitates the optical and mechanical coupling of the bare fibers and the connection elements, and also relates to a method for manufacturing the same.

2. Description of the Related Art

In optical fiber arrays of this type, the alignment intervals between optical-fiber bare fibers are set with high accuracy so that positional matching and optical coupling can be facilitated with ease in relation to the optical fiber lines, optical wave guide lines or the like on optical circuit boards arranged at corresponding alignment intervals.

In conventional optical fiber arrays, optical-fiber bare fiber guide members for accurately setting the alignment intervals between optical-fiber bare fibers are provided as structural members of these optical fiber arrays. The V-groove member a as shown in FIG. 8A is conventionally known as an optical-fiber bare fiber guide member.

More specifically, the above V-groove member a is so configured that a plurality of grooves with substantially V-shaped cross sections (V grooves) a1 are formed lengthwise on its one side. Then, as shown in FIG. 8B, optical-fiber bare fibers c are respectively placed in the V grooves a1 of the V-groove member a. The optical-fiber bare fibers c are secured in place by the two lateral inclined planes of the V grooves a1, and the fixing positions of these optical-fiber bare fibers c are set, by downward pressure from a presser plate d on the upper part.

A plurality of optical-fiber bare fibers c can be aligned at regular intervals by forming a plurality of identically sized V grooves a1 at regular intervals. An optical fiber array e configured as shown in FIG. 8C is obtained by filling the gaps between the optical-fiber bare fibers c (uncovered optical fibers themselves having been stripped of their outer envelopes, i.e., fibers each constituted of a core and a cladding are referred to as "optical-fiber bare fibers"; in a narrow sense, this term applies to portions uncovered by stripping optical-fiber fiber ribbons of their tip outer envelopes), the V-groove member a and the presser plate d with an adhesive and allowing this adhesive to solidify (see Japanese Patent Applications Laid-open No. 5-307129, No. 11-242127, No. 11-326704, No. 2000-275465 and No. 2000-329971).

Now, the optical-fiber bare fiber guide members such as the V-groove member a are required to have high dimensional accuracy, and hence the optical-fiber bare fiber guide members involve a high manufacturing cost.

In addition, conventional optical fiber arrays are provided with the above optical-fiber bare fiber guide members set in as structural members, and hence there has been a problem that the cost of such optical fiber arrays is also proportionally higher.

To solve this problem, a method for manufacturing an optical fiber array by which method the optical-fiber bare fibers can be aligned with high accuracy without setting therein any expensive optical-fiber bare fiber guide members has recently been proposed (see Japanese Patent Application Laid-open No. 6-11625).

More specifically, this manufacturing method entails, as shown in FIG. 9A, installing an optical-fiber fiber ribbon alignment guide g provided on its top surface with a plurality of V grooves formed at an equal pitch, an optical-fiber bare fiber alignment guide h provided on its top surface with a plurality of V grooves formed at an equal pitch (see FIG. 10), and a presser i having trapezoid projections that fit into the V grooves of the optical-fiber bare fiber alignment guide h. The tip portions of optical-fiber fiber ribbons k (portions uncovered by stripping optical-fiber cables j of their jackets j1, i.e., portions covered with ribbon material k1 for fiber ribbons are referred to as "optical-fiber fiber ribbons") are inserted into the V grooves of the optical-fiber fiber ribbon alignment guide g to support these optical-fiber fiber ribbons k in a parallel formation. The tip portions of optical-fiber bare fibers m (the optical-fiber bare fibers in a narrow sense; refer to portions uncovered by stripping the optical-fiber fiber ribbons k of their ribbon material k1 for fiber ribbons are referred to as "optical-fiber bare fiber") are inserted into the V grooves of the optical-fiber bare fiber alignment guide h to support the optical-fiber bare fibers m in a parallel formation. Also, the presser i is placed on the optical-fiber bare fiber alignment guide h to prevent the optical-fiber bare fibers m from shifting upward. Thereafter, the external peripheral surfaces of the optical-fiber bare fibers and optical-fiber fiber ribbons k are coated with an adhesive n.

Next, as shown in FIG. 9B, a bottom plate r (see FIG. 11) is so set that a flat surface p thereof is disposed underneath the optical-fiber bare fibers m and that an angular groove q is disposed underneath the optical-fiber fiber ribbons k. A top plate s (see FIG. 11) is also so set that a flat surface p thereof is disposed above the optical-fiber bare fibers m and that an angular groove q is disposed above the optical-fiber fiber ribbons k. Thus, the optical-fiber bare fibers m are sandwiched between the top plate s and the bottom plate r, in the state of which the adhesive n is allowed to harden to bond the top plate s and the bottom plate r together. Thereafter, the adhesive n and optical-fiber bare fibers m extending from the integrated top plate s and bottom plate r are removed to obtain an optical fiber array t such as that shown in FIG. 9C.

According to this manufacturing method, the optical-fiber bare fibers m are aligned with the aid of an optical-fiber fiber ribbon alignment guide g, an optical-fiber bare fiber alignment guide h and a presser i, and the completed optical fiber array t is devoid of any optical-fiber bare fiber guide members, making it possible to markedly lower the manufacturing costs of such optical fiber arrays.

This manufacturing method, however, has had a problem that the optical-fiber bare fibers m can not be aligned with high accuracy for the reasons stated below, and has not been a method in which manufacturing costs can be lowered without reducing the accuracy of alignment intervals between the optical-fiber bare fibers.

More specifically, in this manufacturing method, it is possible to align with high accuracy the portions of the optical-fiber bare fibers m sandwiched between the optical-fiber bare fiber alignment guide h and the presser i as shown in FIG. 9A (however, as shown in FIG. 9B, these portions correspond to the portions of the optical-fiber bare fibers m that extend from the integrated top plate s and bottom plate r, and are portions removed together with the uncovered adhesive in the manner described above). However, the optical-fiber bare fibers m may loose their tension as they extend from the optical-fiber bare fiber alignment guide h toward the optical-fiber fiber ribbon alignment guide g, making it difficult to align the optical-fiber bare fibers m at these portions with high accuracy. Applying tension to the optical-fiber bare fibers m between the optical-fiber fiber ribbon alignment guide g and the optical-fiber bare fiber alignment guide h has been suggested as a method for preventing the loosening of the optical-fiber bare fibers m. This approach, however, has had a problem that it may cause breakage of the optical-fiber bare fibers m.

In addition, applying the adhesive n to the external peripheral surfaces of the optical-fiber bare fibers m as shown in FIG. 9A may cause the optical-fiber bare fibers m to move close to each other as a result of the surface tension of the adhesive n. Also, when the top plate s or the bottom plate r is brought into contact from above or below with the optical-fiber bare fibers m coated with the adhesive n as shown in FIG. 9B, the optical-fiber bare fibers m and the top plate s or bottom plate r are brought closer to each other by the surface tension of the adhesive n. These may cause the interval between the optical-fiber bare fibers m to vary, making accurate alignment of the optical-fiber bare fibers m difficult to achieve.

Furthermore, bringing the top plate s or the bottom plate r into contact from above or below with the optical-fiber bare fibers m coated with the adhesive n may cause the optical-fiber bare fibers m to shift their positions because of any slight differences in contact pressure on the optical-fiber bare fibers m between the top plate s and the bottom plate r, making accurate alignment of the optical-fiber bare fibers m difficult to achieve.

For these reasons, the method for manufacturing optical fiber arrays disclosed in Japanese Patent Application Laid-open No. 6-11625 has had a problem that the optical-fiber bare fibers m can not be aligned with high accuracy.

Under such technical backgrounds, the present inventor has already proposed an optical fiber array manufacturing method which can lower the manufacturing cost by saving the setting-in of the expensive optical-fiber bare fiber guide member without lowering the accuracy of alignment intervals in the optical-fiber bare fibers (see Japanese Patent Application Laid-open No. 2000-193844, corresponding to U.S. Pat. No. 6,368,441).

More specifically, in this optical fiber array manufacturing method, as shown in FIG. 12A, optical-fiber bare fibers m are held in V grooves h1 of an optical-fiber bare fiber alignment guide h so that they are aligned one by one.

Next, as shown in FIG. 12B, a plate member A provided with an adhesive layer (not shown) is brought into contact with the respective optical-fiber bare fibers m aligned by the optical-fiber bare fiber alignment guide h, and these are pressed on the back side of the plate member A by a transparent pressing means Z to keep the optical-fiber bare fibers m sandwiched between the optical-fiber bare fiber alignment guide h and the plate member A, in the state of which the respective optical-fiber bare fibers m are fastened onto the plate member A through the adhesive layer. Thereafter, the optical-fiber bare fibers m are separated from the optical-fiber bare fiber alignment guide h.

Next, as shown in FIG. 12C, a plate member B is superposingly fitted to the optical-fiber bare fibers m fastened onto the plate member A. Thereafter, an uncured resin material fed onto the plate member B is made to cure into a cured product and the plate member A is unified with the plate member B.

Finally, the optical-fiber bare fibers m extending outward from ends of the unified plate member A and plate member B are removed. Thus, this optical fiber array is completed.

In the optical fiber array manufactured by this method, the optical-fiber bare fibers m held in the region where they have been aligned by the optical-fiber bare fiber alignment guide h are mounted between the plate member A and the plate member B. Hence, compared with the optical fiber array obtained by the method disclosed in Japanese Patent Application Laid-open No. 6-11625, the alignment intervals in the optical-fiber bare fibers can be set with high accuracy.

Now, there is no problem when the thickness dimension of the plate member A and that of the plate member B are uniformly equal over the length in the direction of alignment of the optical-fiber bare fibers m. However, when as shown in FIG. 13 the flat surface of the plate member B on the side opposite to the side on which the optical-fiber bare fibers m are held serves as a disposition standard surface B1 when the array is set in, the thickness dimension of the plate member B may come non-uniform as shown in FIG. 13 (d1 differs from d2). In such a case, because of this non-uniformity in thickness dimension, the distance from central points of the respective optical-fiber bare fibers m to the disposition standard surface B1 may vary to make it impossible to adjust to a desired preset distance H the distance from the disposition standard surface B1 to the central points of the respective optical-fiber bare fibers m. There has been such a problem.

For example, single-mode optical fibers mounted to an optical fiber array and light rays guided through optical waveguide paths have a diameter of about 10 $\mu$m. Hence, if the single-mode optical fibers and the optical waveguide paths are positionally deviated by 10 $\mu$m or more, their mutual conduction can not be ensured, so that any operation to make mutual positional adjustment that may make the intensity of guided light maximum can not be started. There has been such a problem.

Since in some cases the thickness dimension of the plate member B conventionally used may vary in a width of 10 $\mu$m or more, the guided light can not be ensured however accurately the dimensions of optical guide paths are set. Hence, there has been the problem that any operation to make mutual positional adjustment that may make the intensity of guided light maximum can not be started.

Incidentally, there is another problem that, although the positional accuracy in disposing optical-fiber bare fibers can be kept with high accuracy by keeping to a stated value and with high accuracy the thickness dimension of the plate member B on which the optical-fiber bare fibers are to be mounted, this necessitates techniques of working plate members with high accuracy, resulting in a high cost.

SUMMARY OF THE INVENTION

The present invention was made taking note of such problems. Accordingly, an object of the present invention is to provide an optical fiber array in which the distance from the disposition standard surface to the central points of the respective optical-fiber bare fibers can be adjusted to the preset distance H even when plate members having non-uniform thickness dimension are used, and to provide a method for manufacturing such an optical fiber array.

That is, the optical fiber array according to the present invention is an optical fiber array comprising a plurality of optical-fiber bare fibers which are disposed in alignment between two opposing plate members and are optically connected to connection elements in an end-to-end facing arrangement with each other, wherein;

the optical-fiber bare fibers are disposed in contact with a flat surface of one plate member A, an adjustment layer formed of an adhesive is interposed between another plate member B and the plate member A, where a flat surface of the plate member B on its side opposite to the adjustment layer serves as a disposition standard surface when the array is set in; and the adjustment layer, which fulfills conditions of (dmax+r)<H where the desired preset distance from i) a central line of the optical-fiber bare fibers which is formed by connecting central points of end cross sections in the optical-fiber bare fibers disposed in alignment to ii) the disposition standard surface is represented by H, the maximum value of the thickness dimension in the plate member B by dmax, and the radius of the end cross sections of the respective optical-fiber bare fibers by r, compensates a deviation from the preset distance H that is caused by a non-uniformity in thickness dimension in the plate member B, whereby the distance from the central points of the respective optical-fiber bare fibers to the disposition standard surface is set identical or substantially identical to the preset distance H.

The optical fiber array manufacturing method according to the present invention is a method for manufacturing the aforesaid optical fiber array, the method comprising the steps of:

fixing respective optical-fiber bare fibers held in rows of V grooves of an optical-fiber bare fiber alignment guide, onto a flat surface of a plate member A to form a fixed member consisting of the plate member A and a plurality of optical-fiber bare fibers;

adjusting the posture (relative disposition) of at least one of the fixed member and a predetermined standard plane while bringing the respective outer peripheral surfaces of the optical-fiber bare fibers fixed to the flat surface of the plate member A, into contact with the standard plane, to ensure the parallelism between the aforesaid central line of the optical-fiber bare fibers and the standard plane, and to set to zero the vertical distance between i) the respective outer peripheral surfaces of the optical-fiber bare fibers kept in contact with the standard plane and ii) the standard plane;

separating the fixed member and the standard plane by a stated distance while maintaining the parallelism between the aforesaid central line of the optical-fiber bare fibers in the fixed member and the standard plane, and thereafter disposing another plate member B on the standard plane;

making the fixed member and the standard plane close by a stated distance while maintaining the parallelism between the aforesaid central line of the optical-fiber bare fibers in the fixed member and the standard plane, and thereafter joining the plate member B disposed on the standard plane and the plate member A of the fixed member in the state an adhesive is interposed between them; and curing the adhesive to form an adjustment layer which fulfills the aforesaid conditions of (dmax+r)<H, to set the distance from the central points of the respective optical-fiber bare fibers to the disposition standard surface identical or substantially identical to the preset distance H.

BRIEF DESCRIPTION OF THE DRAWINGS

FIGS. 3A, 3B and 3C are illustrations showing subsequent steps for manufacturing the optical fiber array according to Example 1.

FIGS. 9A, 9B and 9C are illustrations showing steps for manufacturing an optical fiber array according to a conventional example where any optical-fiber bare fiber guide member is not set in.

FIG. 10 is a schematic perspective view of optical-fiber bare fiber alignment guide used in an optical fiber array manufacturing method according to the conventional example where any optical-fiber bare fiber guide member is not set in.

FIG. 11 is a schematic perspective view of a top plate and a bottom plate which are used in an optical fiber array manufacturing method according to the conventional example where any optical-fiber bare fiber guide member is not set in.

FIGS. 12A, 12B and 12C are illustrations showing steps for manufacturing an optical fiber array according to an improved method where any optical-fiber bare fiber guide member is not set in.

DESCRIPTION OF THE PREFERRED EMBODIMENTS

The present invention is described below in detail with reference to the accompanying drawings.

Figure 1:
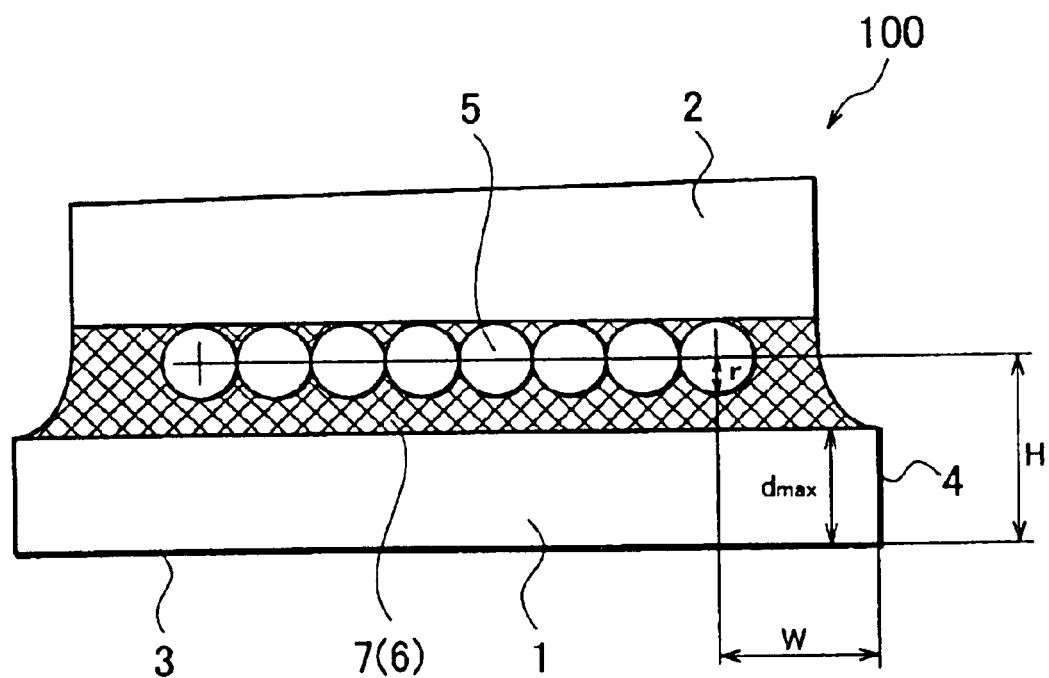
FIG. 1 is a schematic sectional view showing the configuration of the optical fiber array according to the present invention.

As shown in FIG. 1, an optical fiber array 100 is chiefly constituted of a pair of plate members, a plate member-A 2 and a plate member-B 1, a plurality of optical-fiber bare fibers 5 disposed in alignment between these plate member-A 2 and plate member-B 1, and an adjustment layer 7 likewise provided between the plate member-A 2 and the plate member-B 1 and formed of an adhesive 6 comprised of a mixture of a resin and an inorganic filler.

The respective optical-fiber bare fibers 5 are disposed in contact with a flat surface of the plate member-A 2. The adjustment layer 7 is interposed between the plate member-B 1 and the plate member-A 1, where a flat surface of the plate member-B on its side opposite to the adjustment layer 7 serves as a disposition standard surface 3 when the array is set in. The adjustment layer, which fulfills conditions of (dmax+r)<H where the desired preset distance from i) a central line of the optical-fiber bare fibers 5 which is formed by connecting central points of end cross sections in the optical-fiber bare fibers 5 disposed in alignment to ii) the disposition standard surface 3 is represented by H, the maximum value of the thickness dimension in the plate member-B 1 by dmax, and the radius of the end cross sections of the respective optical-fiber bare fibers 5 by r, compensates a deviation from the preset distance H that is caused by a non-uniformity in thickness dimension in the plate member-B 1, whereby the distance from the central points of the respective optical-fiber bare fibers 5 to the disposition standard surface 3 is set identical or substantially identical to the preset distance H. (The central line which is formed by connecting central points of end cross sections in the optical-fiber bare fibers 5 is herein often simply called the central line.)

In addition, in this optical fiber array 100, the horizontal distance W between one side (lateral surface) of at least one of the plate member-A 2 and the plate member-B 1 and the central point of an end cross section of an arbitrary optical-fiber bare fiber 5 (in FIG. 1, the optical-fiber bare fiber on the right end side as viewed in the drawing) is set to a desired preset value with high accuracy.

In this optical fiber array 100, the distance from the central points of the respective optical-fiber bare fibers 5 to the disposition standard surface 3 is set identical or substantially identical to the preset distance H, and also the horizontal distance W between one side (lateral surface) of the plate member-A 2 or plate member-B 1 and the arbitrary optical-fiber bare fiber 5 is set to the desired preset value with high accuracy. Hence, where this array is set up making the flat surface of the plate member-B 1 serve as the disposition standard surface 3, the optical fiber array has an advantage that it facilitates the optical and mechanical coupling with the connection elements such as optical waveguide paths disposed opposingly to this array.

A method for manufacturing this optical fiber array 100 is described below with reference to the accompanying drawings.

Figure 2A:
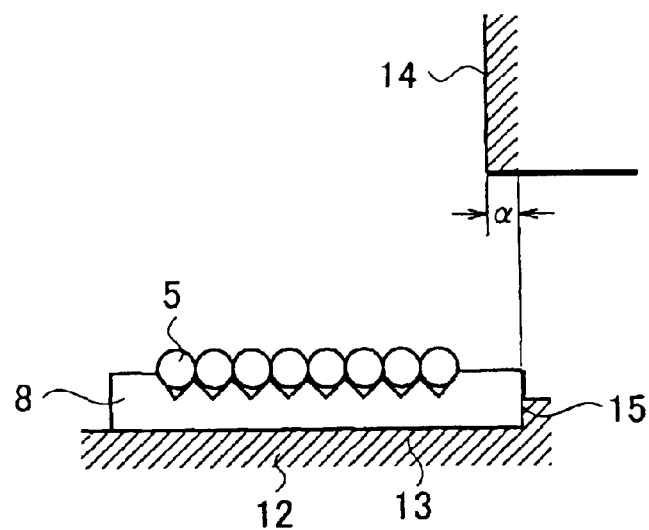
FIGS. 2A, 2B and 2C are illustrations showing steps for manufacturing an optical fiber array according to Example 1.

First, as shown in FIG. 2A, an optical-fiber bare fiber alignment guide 8 having V grooves at its surface is placed on a vertical-position standard wall surface 13 of a plate member-B supporting means 12. One side (lateral surface) of this optical-fiber bare fiber alignment guide 8 is disposed being pressed against a horizontal-position standard wall surface 15 of the plate member-B supporting means 12. The respective V grooves of the optical-fiber bare fiber alignment guide 8 are arranged in an accurate horizontal position extending from the lateral surface of the optical-fiber bare fiber alignment guide 8 on its side pressed against the horizontal-position standard wall surface 15. Hence, it follows that the respective V grooves are arranged in an accurate horizontal position in respect to the horizontal-position standard wall surface 15. Then, optical-fiber bare fibers 5 are respectively received in the V grooves so as to be held in alignment.

Figure 2B:
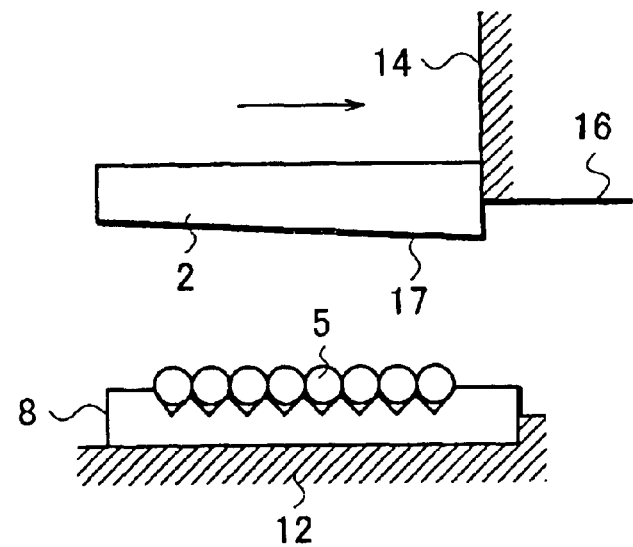

Next, as shown in FIG. 2B, a plate member-A 2 is carried on a plate member-A supporting means (not shown). The plate member-A 2 is also so carried that its one side (lateral surface) is pressed against a horizontal-position standard wall surface 14 which is part of the plate member-A supporting means. Here, the horizontal distance α between the horizontal-position standard wall surface 14 and the horizontal-position standard wall surface 15 is kept set accurately at the desired value as shown in FIG. 2A. A thin fixing adhesive layer 17 is also formed on the plate member-A 2 on its side facing the optical-fiber bare fiber alignment guide 8. For the fixing adhesive layer 17, an ultraviolet-curable adhesive is used, for example. For the plate member-A 2 and the plate member-A supporting means, materials transparent to ultraviolet rays is used, for example.

Figure 2C:
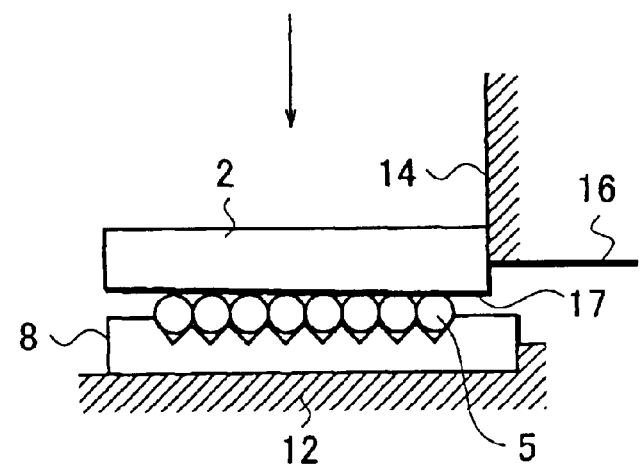

Next, as shown in FIG. 2C, the plate member-A 2 is made to descend to bring its fixing adhesive layer 17 into contact with the optical-fiber bare fibers 5 aligned on the optical-fiber bare fiber alignment guide 8. In this state, the plate member-A 2 and plate member-A supporting means are irradiated by ultraviolet rays to make the latter ultraviolet rays transmitted through the former to cause the fixing adhesive layer 17 to cure, so that the optical-fiber bare fibers 5 are fixed to the plate member-A 2.

Next, as shown in FIG. 3A, a fixed member 10 consisting of the optical-fiber bare fibers 5 and the plate member-A 2 is made to ascend, and the optical-fiber bare fiber alignment guide 8 is removed from the plate member-B supporting means 12. As to the optical-fiber bare fiber alignment guide 8, the same one or a replica having the same size can repeatedly be used, and hence it is easy to always set to the desired constant value the horizontal distance between the horizontal-position standard wall surface 15 of the plate member-B supporting means 12 and the optical-fiber bare fibers 5.

Next, as shown in FIG. 3B, the fixed member 10 consisting of the optical-fiber bare fibers 5 and the plate member-A 2 is made to descend to press the outer peripheral bottom surfaces of the optical-fiber bare fibers 5 against the vertical-position standard wall surface 13 of the plate member-B supporting means 12. Here, the plate member-A supporting means may be controlled by means of a swing mechanism (not shown) so that the posture (relative disposition) of the fixed member 10 can freely be changed in the state the lateral surface of the plate member-A supporting means is in contact with the horizontal-position standard wall surface 14. Thus, the outer peripheral bottom surfaces of the optical-fiber bare fibers 5 can be made to extend accurately along the vertical-position standard wall surface 13 and can be made parallel to the vertical-position standard wall surface 13 (i.e., the central line of the optical-fiber bare fibers 5 is parallel to the vertical-position standard wall surface 13). In the state this parallelism is maintained, the posture of the plate member-A supporting means and fixed member 10 is fixed by means of a chuck mechanism (not shown). Also, the height h0 of a vertical-position standard wall surface 16 is recorded as a standard value of "zero" in the state the outer peripheral bottom surfaces of the optical-fiber bare fibers 5 are in contact with the vertical-position standard wall surface 13 (i.e., the vertical distance between the vertical-position standard wall surface 13 and the outer peripheral bottom surfaces of the optical-fiber bare fibers 5 kept in contact with the standard wall surface 13 is zero). To measure the height of the vertical-position standard wall surface 16, a high-precision displacement measuring means as exemplified by a laser distance meter may be used.

Next, as shown in FIG. 3C, the fixed member 10 is made to ascend to a stated height in the state that the parallelism between the outer peripheral bottom surfaces of the optical-fiber bare fibers 5 and the vertical-position standard wall surface 13 (i.e., the parallelism between the central line of the optical-fiber bare fibers 5 and the vertical-position standard wall surface 13) is maintained, also that the horizontal distance α between the horizontal-position standard wall surface 14 and the horizontal-position standard wall surface 15 is kept constant, and still also that the lateral surface of the plate member-A 2 in the fixed member 10 is kept in contact with the horizontal-position standard wall surface 14. Thereafter, the plate member-B 1 is placed on the vertical-position standard wall surface 13 of the plate member-B supporting means 12. Here, one side (lateral surface) of the plate member-B 1 is disposed being pressed against the horizontal-position standard wall surface 15 of the plate member-B supporting means 12.

Figure 4A:
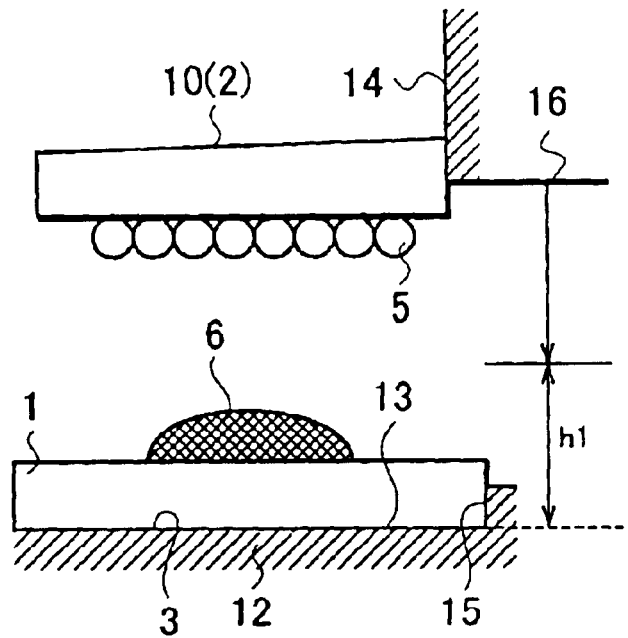
FIGS. 4A and 4B are illustrations showing further subsequent steps for manufacturing the optical fiber array according to Example 1.

Next, as shown in FIG. 4A, an adhesive 6 is fed to the top surface of the plate member-B 1 placed being pressed against the horizontal-position standard wall surface 15 of the plate member-B supporting means 12. As the adhesive 6, an ultraviolet-curable adhesive is used, for example.

Figure 4B:
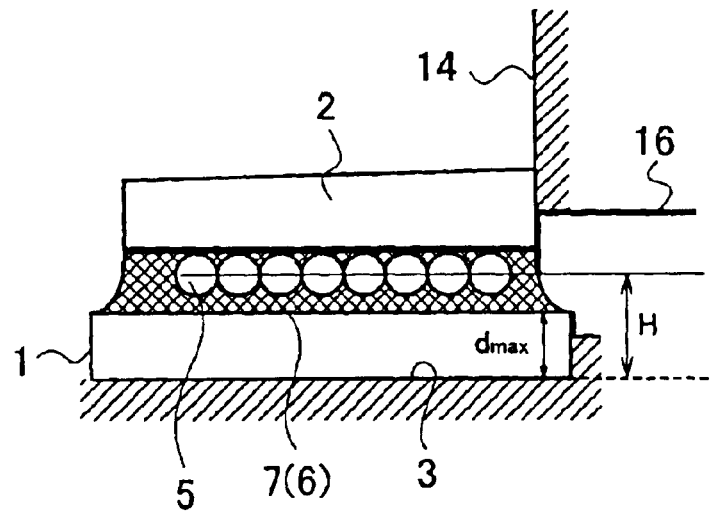

Thereafter, in the state the posture and parallel position of the fixed member 10 consisting of the optical-fiber bare fibers 5 and the plate member-A 2 are maintained, the plate member-A supporting means is made to descend until the height of the vertical-position standard wall surface 16 comes to be h1, so that the state shown in FIG. 4B is brought about, in which the plate member-A 2, the plate member-B 1 and the optical-fiber bare fibers 5 have been joined together via the adhesive 6.

When the height of the vertical-position standard wall surface 16 is h1, as shown in FIG. 4B an adjustment layer 7 formed of the adhesive 6 is interposed between the outer peripheral bottom surfaces of the optical-fiber bare fibers 5 and the top surface of the plate member-B 1. At this stage, the plate member-A 2 and plate member-A supporting means are irradiated by ultraviolet rays to make the latter ultraviolet rays transmitted through the former to cause the adhesive 6 to cure, so that the plate member-A 2, the plate member-B 1 and the optical-fiber bare fibers 5 are integrated. Thus, the optical fiber array 100 shown in FIG. 1 is completed.

In this optical fiber array manufacturing method, as shown in FIG. 3B the fixed member 10 consisting of the optical-fiber bare fibers 5 and the plate member-A 2 is made to descend to press the outer peripheral bottom surfaces of the optical-fiber bare fibers 5 against the vertical-position standard wall surface 13 of the plate member-B supporting means 12. As the result, the outer peripheral bottom surfaces of the optical-fiber bare fibers 5 extend accurately along the vertical-position standard wall surface 13 to come parallel to the vertical-position standard wall surface 13. Since the diameter of each optical-fiber bare fiber 5 is set to a constant value with high accuracy of ±0.5 µm or less, the central line of the optical-fiber bare fibers 5 which is formed by connecting central points of end cross sections in the respective optical-fiber bare fibers 5 is also set parallel to the vertical-position standard wall surface 13.

Since, in the state this parallelism is maintained, the plate member-B 1 is placed on the vertical-position standard wall surface 13 of the plate member-B supporting means 12 to complete the integration of the plate member-B 1 and the fixed member 10 consisting of the optical-fiber bare fibers 5 and the plate member-A 2, as shown in FIG. 4B the central line of the optical-fiber bare fibers 5 and the disposition standard surface 3 of the plate member-B 1 can be set accurately parallel.

Even if the thickness dimension of the plate member-B 1 to be used is non-uniform (maximum thickness dmax), the adjustment layer 7 interposed between the central line of the optical-fiber bare fibers 5 and the plate member-B 1 compensates a deviation from the preset distance H that is caused by this non-uniformity in thickness dimension, whereby the distance from the central points of the respective optical-fiber bare fibers 5 to the disposition standard surface 3 is set identical or substantially identical to the preset distance H.

In this optical fiber array manufacturing method, the height h1 of the vertical-position standard wall surface 16 as shown in FIG. 4A is also adjusted so that the distance from the central line of the optical-fiber bare fibers 5 to the disposition standard surface 3 can be adjusted to the desired preset distance H.

Here, if the optical fiber array is constructed bringing the optical-fiber bare fibers 5 into contact with the flat surface of the plate member-B 1 (different from the case shown in FIG. 4B), the thickness dimension of the plate member-B 1 does not come up to the preset distance H from the central line of the optical-fiber bare fibers 5 to the disposition standard surface 3. The absolute value of the thickness dimension also varies between different plate members-B 1.

However, in the optical fiber array and method for its manufacture according to the present invention, the adjustment layer interposed between the optical-fiber bare fibers 5 and the plate member-B 1 can arbitrarily change the thickness dimension in virtue of the flow of the adhesive (resin) when it is put between them before its curing. This makes it possible to adjust the height h1 of the vertical-position standard wall surface 16, so that the distance from the central line of the respective optical-fiber bare fibers 5 to the disposition standard surface 3 of the plate member-B 1 can be made uniform to the desired preset distance H with high accuracy. Incidentally, the high-precision displacement measuring means as exemplified by a laser distance meter may be used to measure the height of the vertical-position standard wall surface 16, and hence the preset distance H can be adjusted in units of micrometers. Even when any error of mechanical registration of holding mechanisms in the respective members is taken into account, it is well easy to set the preset distance H with an accuracy of ±5 µm or less.

In addition, in the optical fiber array manufacturing method according to the present invention, the horizontal position of the respective V grooves of the optical-fiber bare fiber alignment guide 8 is accurately defined in respect to the horizontal-position standard wall surface 15 as shown in FIG. 2A. Hence, the horizontal position of rows of the optical-fiber bare fibers 5 (i.e., the horizontal position of the central line of the optical-fiber bare fibers 5) is accurately defined in respect to the horizontal-position standard wall surface 15, the horizontal position of the plate member-A 2 is accurately defined in respect to the horizontal-position standard wall surface 14 as shown in FIG. 2B, and also the horizontal distance α between the horizontal-position standard wall surface 14 and the horizontal-position standard wall surface 15 each other is kept at a constant value as shown in FIG. 2C. Hence, the horizontal distance W (see FIG. 1) between any central points of end cross sections in the optical-fiber bare fibers 5 and the lateral surface of the plate member-B 1 is also set with high accuracy.

The present invention is described below in greater detail by giving Examples.

EXAMPLE 1

In the step shown in FIG. 2A, the optical-fiber bare fiber alignment guide 8 is placed on the vertical-position standard wall surface 13 of the plate member-B supporting means 12. One side (lateral surface) of the optical-fiber bare fiber alignment guide 8 is disposed being pressed against the horizontal-position standard wall surface 15 of the plate member-B supporting means 12. The central position of the V groove at the right-most end as viewed in the drawing in the optical-fiber bare fiber alignment guide 8 is set to be accurately 1,000 µm from the lateral surface of the optical-fiber bare fiber alignment guide 8 on its side pressed against the horizontal-position standard wall surface 15. Then, the optical-fiber bare fibers 5 are respectively received in the V grooves so as to be held in alignment. Here, optical-fiber bare fibers 5 each have a diameter of 125 µm.

In the subsequent step shown in FIG. 2B, the plate member-A 2 is carried on the plate member-A supporting means (not shown). The plate member-A 2 is made of quartz glass, and has a thickness of 1,000 μm and a width of 3,500 μm. The plate member-A 2 is so carried that its one side (lateral surface) is pressed against the horizontal-position standard wall surface 14 which is part of the plate member-A supporting means. Here, the horizontal distance α (see FIG. 2A) between the horizontal-position standard wall surface 14 and the horizontal-position standard wall surface 15 is set to be accurately 250 μm. The thin fixing adhesive layer 17 is also formed on the plate member-A 2 on its side facing the optical-fiber bare fiber alignment guide 8. The fixing adhesive layer 17 is formed of an ultraviolet-curable epoxy resin. The plate member-A supporting means is made of quartz glass, and is transparent to ultraviolet rays.

In the step shown in FIG. 2C, the plate member-A 2 is made to descend to bring its fixing adhesive layer 17 into contact with the optical-fiber bare fibers 5 aligned on the optical-fiber bare fiber alignment guide 8. In this state, the plate member-A 2 and plate member-A supporting means are irradiated by ultraviolet rays to make the latter ultraviolet rays transmitted through the former to cause the fixing adhesive layer 17 to cure, so that the optical-fiber bare fibers 5 are fixed to the plate member-A 2.

In the step shown in FIG. 3A, the fixed member 10 consisting of the optical-fiber bare fibers 5 and the plate member-A 2 is made to ascend, and the optical-fiber bare fiber alignment guide 8 is removed from the plate member-B supporting means 12. As to the optical-fiber bare fiber alignment guide 8, the same one is repeatedly used.

In the step shown in FIG. 3B, the fixed member 10 is made to descend to press the outer peripheral bottom surfaces of the optical-fiber bare fibers 5 against the vertical-position standard wall surface 13 of the plate member-B supporting means 12. Here, the plate member-A supporting means may be controlled by means of a swing mechanism (not shown) so that the posture (relative disposition) of the fixed member 10 can freely be changed in the state the lateral surface of the plate member-A supporting means in the fixed member 10 is in contact with the horizontal-position standard wall surface 14. Thus, the outer peripheral bottom surfaces of the optical-fiber bare fibers 5 can be made to extend accurately along the vertical-position standard wall surface 13 and can be made parallel to the vertical-position standard wall surface 13. In the state this parallelism is maintained, the posture of the plate member-A supporting means and fixed member 10 is fixed by means of a chuck mechanism (not shown). Also, the height h0 of the vertical-position standard wall surface 16 is reset to the standard value of "zero" in the state the outer peripheral bottom surfaces of the optical-fiber bare fibers 5 are in contact with the vertical-position standard wall surface 13 (i.e., the vertical distance between the vertical-position standard wall surface 13 and the outer peripheral bottom surfaces of the optical-fiber bare fibers 5 kept in contact with the standard wall surface 13 is zero). To measure the height of the vertical-position standard wall surface 16, a laser distance meter is used.

In the step shown in FIG. 3C, the fixed member 10 is made to ascend until the measured value of the height of the vertical-position standard wall surface 16 come to be 5,000 μm or more, in the state that the parallelism between the outer peripheral bottom surfaces of the optical-fiber bare fibers 5 and the vertical-position standard wall surface 13 (i.e., the parallelism between the central line of the optical-fiber bare fibers 5 and the vertical-position standard wall surface 13) is maintained, also that the horizontal distance a between the horizontal-position standard wall surface 14 and the horizontal-position standard wall surface 15 is kept constant, and still also that the lateral surface of the plate member-A 2 in the fixed member 10 is kept in contact with the horizontal-position standard wall surface 14. Thereafter, the plate member-B 1 is placed on the vertical-position standard wall surface 13 of the plate member-B supporting means 12. Here, one side (lateral surface) of the plate member-B 1 is disposed being pressed against the horizontal-position standard wall surface 15 of the plate member-B supporting means 12. The plate member-B 1 is made of quartz glass, and has a non-uniformity of ±2 μm in a thickness of 950 μm and has a width of 4,000 μm.

In the step shown in FIG. 4A, the adhesive 6 is fed to the top surface of the plate member-B 1. As the adhesive 6, used is an ultraviolet-curable epoxy resin (trade name: NA3925; available from NTT-AT Co.) in which 25% by weight of a quartz filler has been mixed to control its cure shrinkage to 4% or less. Thereafter, in the state the posture and horizontal position of the fixed member 10 are maintained, the plate member-A supporting means is made to descend until the height h1 of the vertical-position standard wall surface 16 comes to be 1,000 μm, so that the state shown in FIG. 4B is brought about, in which the plate member-A 2, the plate member-B 1 and the optical-fiber bare fibers 5 have been joined together via the adhesive 6.

When the height h1 of the vertical-position standard wall surface 16 is 1,000 μm, the adjustment layer 7, which involves the non-uniformity of ±2 μm in thickness in respect to a thickness center value of 50 μm, is interposed between the outer peripheral bottom surfaces of the optical-fiber bare fibers 5 and the top surface of the plate member-B 1. At this stage, the plate member-A 2 and plate member-A supporting means are irradiated by ultraviolet rays to make the latter ultraviolet rays transmitted through the former to cause the adhesive 6 to cure, so that the plate member-A 2, the plate member-B 1 and the optical-fiber bare fibers 5 are integrated. Thus, the optical fiber array 100 shown in FIG. 1 is completed. Here, the thickness of the adjustment layer has decreased by 2 μm as a result of the cure shrinkage to come to be 48 μm. Also, the preset distance H between the central line of the optical-fiber bare fibers 5 and the disposition standard surface 3 in the plate member-B 1 has come to be 1,060.5 μm.

The thickness dimension of the plate member-B 1 varies as shown in FIG. 1, but such variation is cancelled or compensated by the variation of the adjustment layer 7 (in virtue of the flow of the adhesive before curing as described above) interposed between the rows of the optical-fiber bare fibers 5 and the plate member-B 1. Thus, the preset distance H between the rows of the optical-fiber bare fibers 5 and the disposition standard surface 3 in the plate member-B 1 is kept constant at 1,060.5 μm without regard to any spots in the plate member-B 1. The horizontal distance W between the central point of an end cross section of the right-most arbitrary optical-fiber bare fiber 5 and the lateral surface 4 of the plate member-B 1 (see FIG. 1) is also set to 1,000 μm.

Subsequently, the above steps were repeated but changing the plate member-B 1. The plate member-B 1 used this time was 960 μm in thickness, different from the previous thickness 950 μm. According to entirely the same procedure, the plate member-A supporting means was made to descend until the height h1 of the vertical-position standard wall surface 16 came to be 1,000 μm, so that an adjustment layer 7 of 40 μm in thickness was formed between the outer peripheral bottom surfaces of the optical-fiber bare fibers 5 and the top surface of the plate member-B 1. This adjustment layer 7 came to be 38.4 μm upon cure shrinkage. As the result, the preset distance H between the central line of the optical-fiber bare fibers 5 and the disposition standard surface 3 in the plate member-B 1 came to be 1,060.9 μm, showing a result corresponding with the previous case with high accuracy.

EXAMPLE 2

An optical fiber array manufacturing method different from Example 1 is described below in detail with reference to the drawings.

Figure 5A:
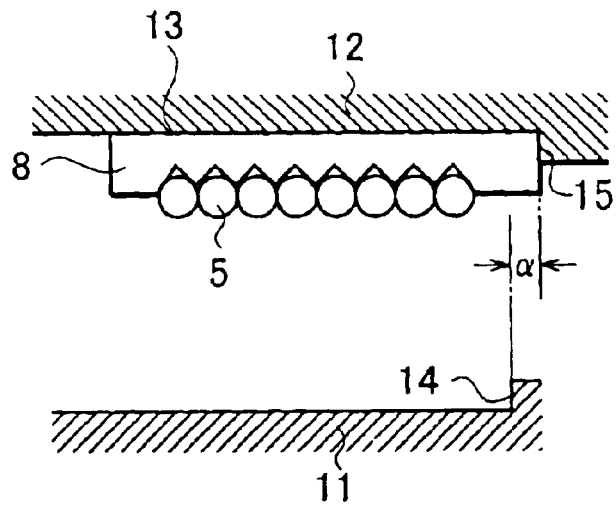
FIGS. 5A, 5B and 5C are illustrations showing steps for manufacturing an optical fiber array according to Example 2.

In a step shown in FIG. 5A, the optical-fiber bare fiber alignment guide 8 is placed on the vertical-position standard wall surface 13 of the plate member-B supporting means 12, which is provided upside down in this Example. One side (lateral surface) of the optical-fiber bare fiber alignment guide 8 is disposed being pressed against the horizontal-position standard wall surface 15 of the plate member-B supporting means 12. The central position of the V groove at the right-most end as viewed in the drawing in the optical-fiber bare fiber alignment guide 8 is set to be accurately 1,000 μm from the lateral surface of the optical-fiber bare fiber alignment guide 8 on its side pressed against the horizontal-position standard wall surface 15. Then, the optical-fiber bare fibers 5 are respectively received in the V grooves so as to be held in alignment. Here, the V grooves of the optical-fiber bare fiber alignment guide 8 face downward as shown in FIG. 5A, where the optical-fiber bare fibers 5 can be received in alignment in the V grooves in virtue of rigidity the optical-fiber bare fibers 5 have (provided that the optical-fiber bare fibers 5 are fastened with a supporting means (not shown) on its base end side, i.e., on its optical-fiber fiber ribbon side). The optical-fiber bare fibers 5 each have a diameter of 125 μm.

Figure 5B:
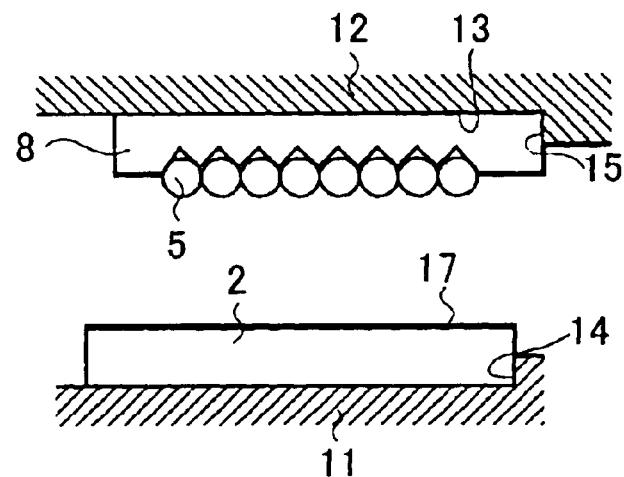

In a subsequent step shown in FIG. 5B, the plate member-A 2 is carried on a plate member-A supporting means 11. The plate member-A 2 is made of quartz glass, and has a thickness of 1,000 μm and a width of 3,500 μm. The plate member-A 2 is so carried that its one side (lateral surface) is pressed against the horizontal-position standard wall surface 14 of the plate member-A supporting means 11. Here, the horizontal distance α (see FIG. 5A) between the horizontal-position standard wall surface 14 and the horizontal-position standard wall surface 15 is set to be accurately 250 μm. The thin fixing adhesive layer 17 is also formed on the plate member-A 2 on its side facing the optical-fiber bare fiber alignment guide 8. The fixing adhesive layer 17 is formed of an ultraviolet-curable epoxy resin. The plate member-A supporting means 11 is made of quartz glass, and is transparent to ultraviolet rays.

Figure 5C:
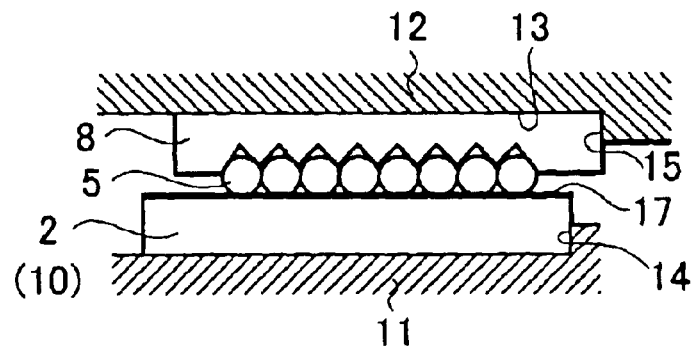

In a step shown in FIG. 5C, the optical-fiber bare fiber alignment guide 8 is made to descend to bring the fixing adhesive layer 17 into contact with the optical-fiber bare fibers 5 aligned on the optical-fiber bare fiber alignment guide 8. In this state, the plate member-A 2 and plate member-A supporting means 11 are irradiated by ultraviolet rays to make the latter ultraviolet rays transmitted through the former to cause the fixing adhesive layer 17 to cure, so that the optical-fiber bare fibers 5 are fixed to the plate member-A 2 to come into the fixed member 10 consisting of the optical-fiber bare fibers 5 and the plate member-A 2.

Figure 6A:
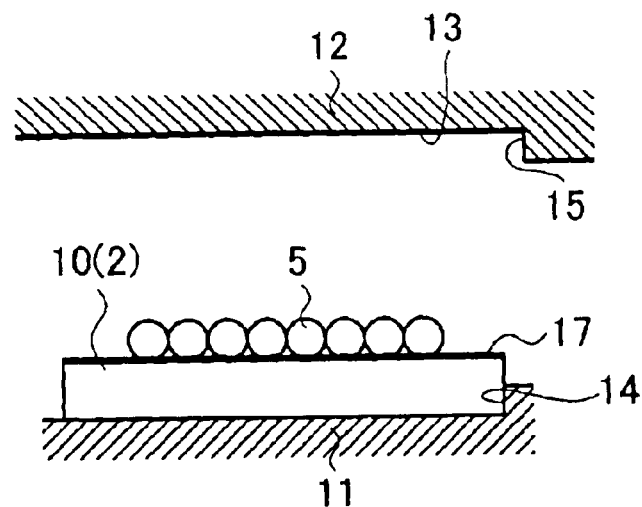
FIGS. 6A, 6B and 6C are illustrations showing subsequent steps for manufacturing the optical fiber array according to Example 2.

In a step shown in FIG. 6A, the plate member-B supporting means 12 is made to ascend, and the optical-fiber bare fiber alignment guide 8 is removed from the plate member-B supporting means 12. As to the optical-fiber bare fiber alignment guide 8, the same one is repeatedly used.

Figure 6B:
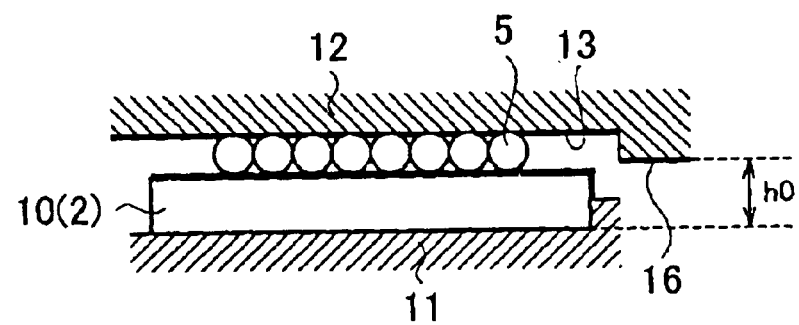

In a step shown in FIG. 6B, the plate member-B supporting means 12 is made to descend to press the outer peripheral top surfaces of the optical-fiber bare fibers 5 against the vertical-position standard wall surface 13 of the plate member-B supporting means 12. Here, the plate member-B supporting means 12 may be controlled by means of a swing mechanism (not shown) so that the inclination of the vertical-position standard wall surface 13 can freely be changed in the state the horizontal position of the horizontal-position standard wall surface 15 is kept unchanged. Thus, the vertical-position standard wall surface 13 can be made to extend accurately along the outer peripheral top surfaces of the optical-fiber bare fibers 5, and can be made parallel to the outer peripheral top surfaces of the optical-fiber bare fibers 5 (i.e., the central line of the optical-fiber bare fibers 5 and the vertical-position standard wall surface 13 are parallel to each other). In the state this parallelism is maintained, the posture of the plate member-B supporting means 12 is fixed by means of a chuck mechanism (not shown). Also, the height h0 of the vertical-position standard wall surface 16 is reset to the standard value of "zero" in the state the outer peripheral top surfaces of the optical-fiber bare fibers 5 are in contact with the vertical-position standard wall surface 13 (i.e., the vertical distance between the vertical-position standard wall surface 13 and the outer peripheral top surfaces of the optical-fiber bare fibers 5 kept in contact with the standard wall surface 13 is zero). To measure the height of the vertical-position standard wall surface 16, a laser distance meter is used.

Figure 6C:
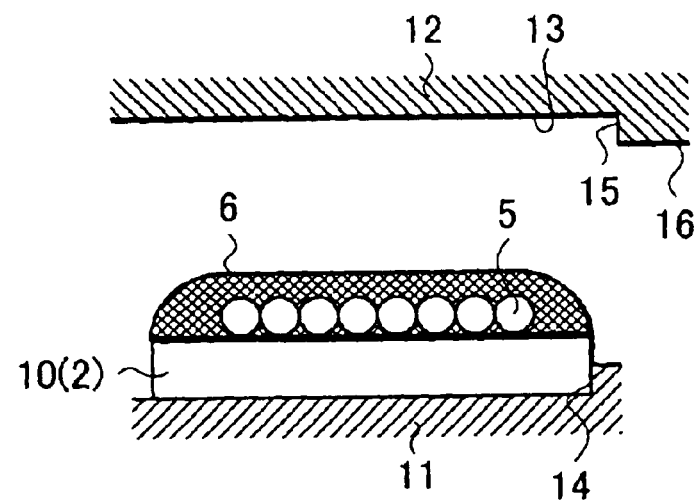

In a step shown in FIG. 6C, the plate member-B supporting means 12 is made to ascend until the measured value of the height of the vertical-position standard wall surface 16 come to be 5,000 μm or more, in the state that the parallelism between the outer peripheral top surfaces of the optical-fiber bare fibers 5 fastened to the plate member-A 2 and the vertical-position standard wall surface 13 in the plate member-B supporting means 12 is maintained, also that the horizontal distance α between the horizontal-position standard wall surface 14 and the horizontal-position standard wall surface 15 is kept constant, and still also that the lateral surface of the plate member-A 2 in the fixed member 10 is kept in contact with the horizontal-position standard wall surface 14. Then, the adhesive 6 is fed to the top surface of the plate member-A 2. As the adhesive 6, used is an ultraviolet-curable epoxy resin (trade name: NA3925; available from NTT-AT Co.) in which 25% by weight of a spherical quartz filler has been mixed to control its cure shrinkage to 4% or less.

Figure 7A:
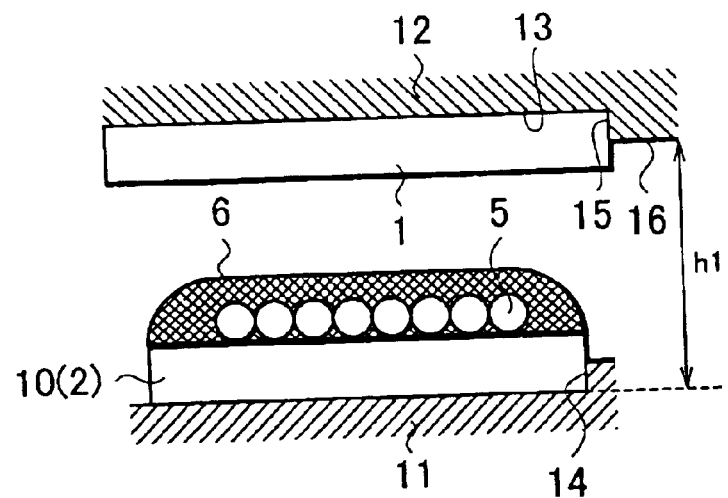
FIGS. 7A and 7B are illustrations showing further subsequent steps for manufacturing the optical fiber array according to Example 2.

In a step shown in FIG. 7A, the plate member-B 1 is placed on the vertical-position standard wall surface 13 of the plate member-B supporting means 12. Here, one side (lateral surface) of the plate member-B 1 is disposed being pressed against the horizontal-position standard wall surface 15 of the plate member-B supporting means 12. The plate member-B 1 is made of quartz glass, and has a non-uniformity of ±2 μm in a thickness of 950 μm and has a width of 4,000 μm.

Figure 7B:
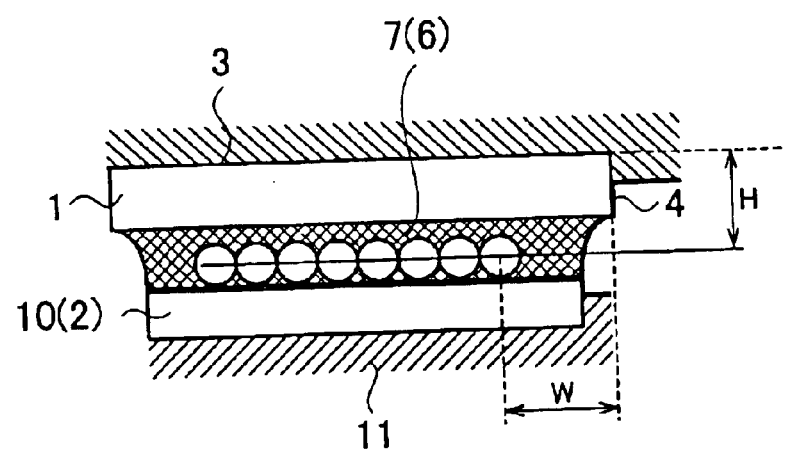
Figure 8A:
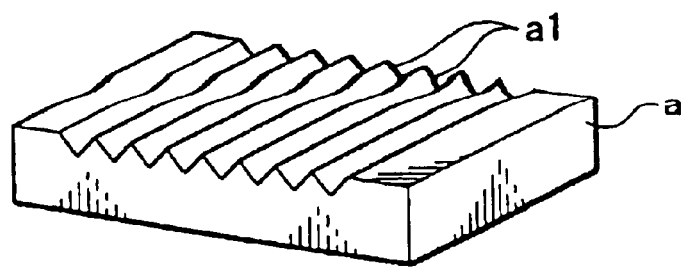
FIG. 8A is a schematic perspective view of a V-groove member according to a conventional example.
Figure 8B:
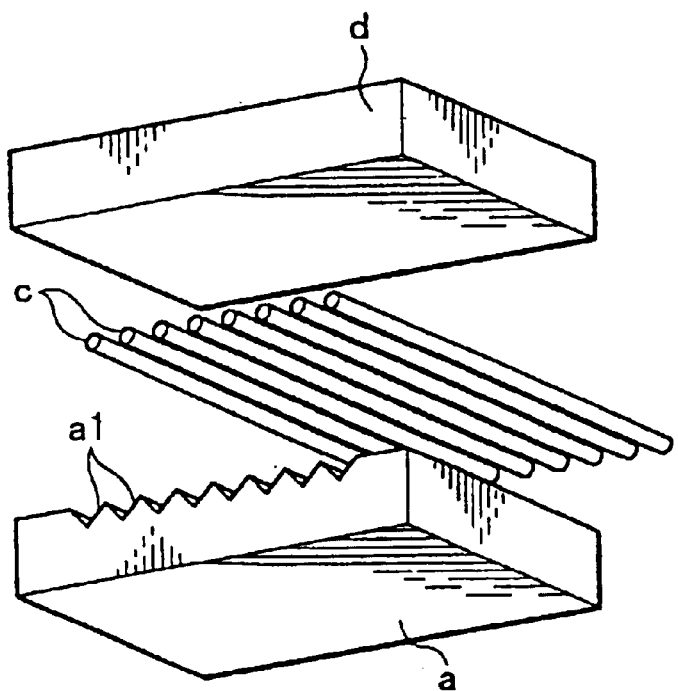
FIG. 8B, an exploded perspective view of a conventional optical fiber array where the V-groove member is set in as a structural member; and 8C, a schematic perspective view of the conventional optical fiber array.
Figure 8C:
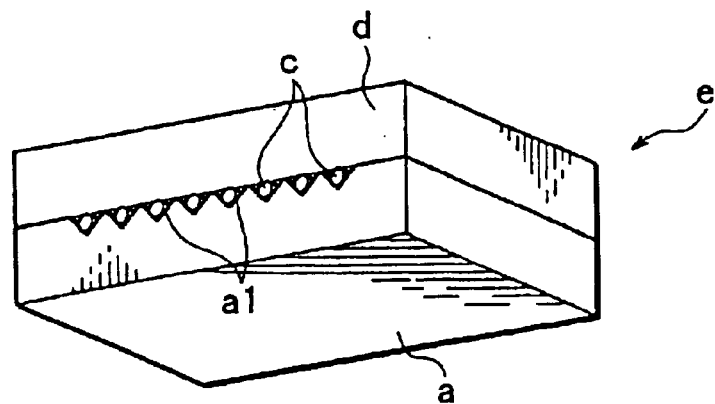
Figure 9A:
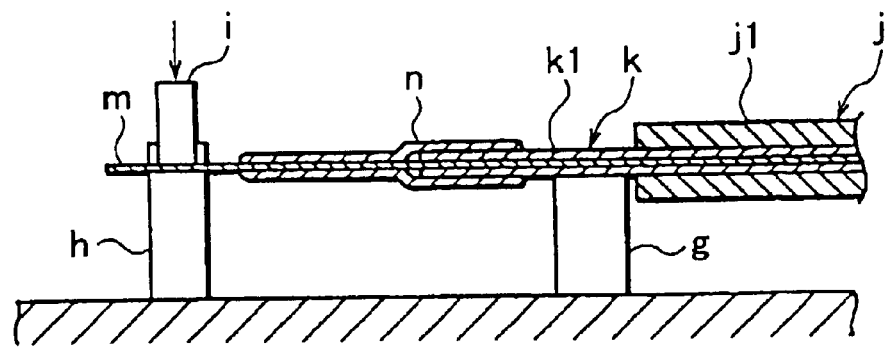
Figure 9B:
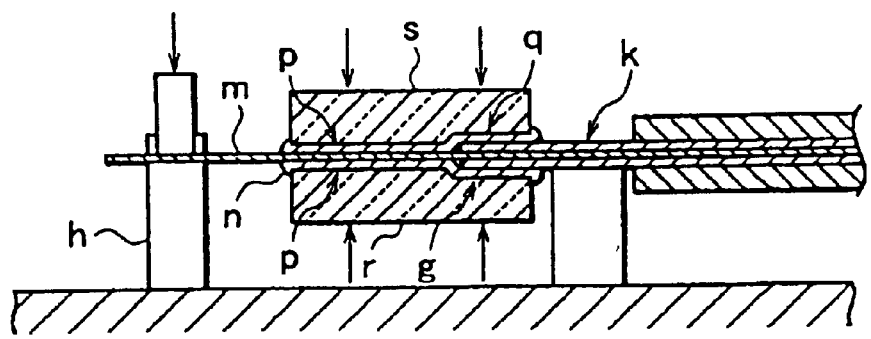
Figure 9C:
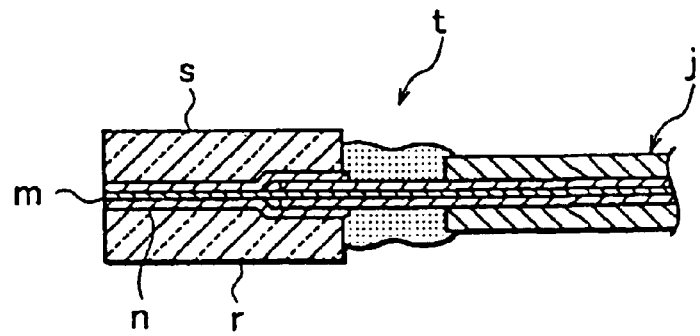
Figure 10:
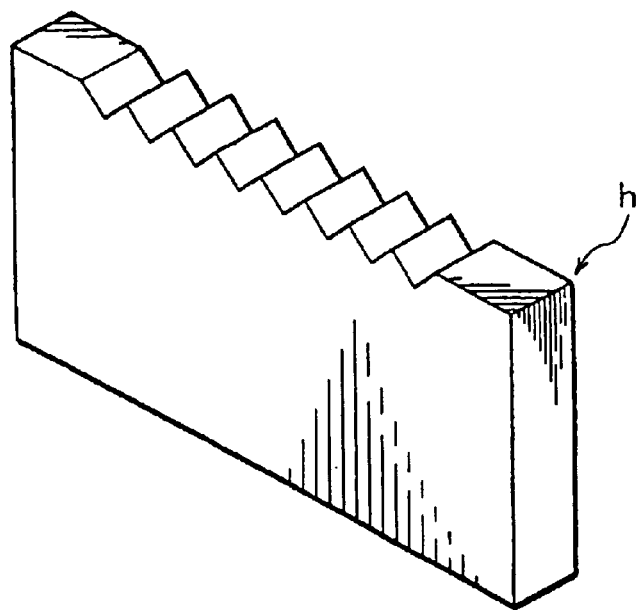
Figure 11:
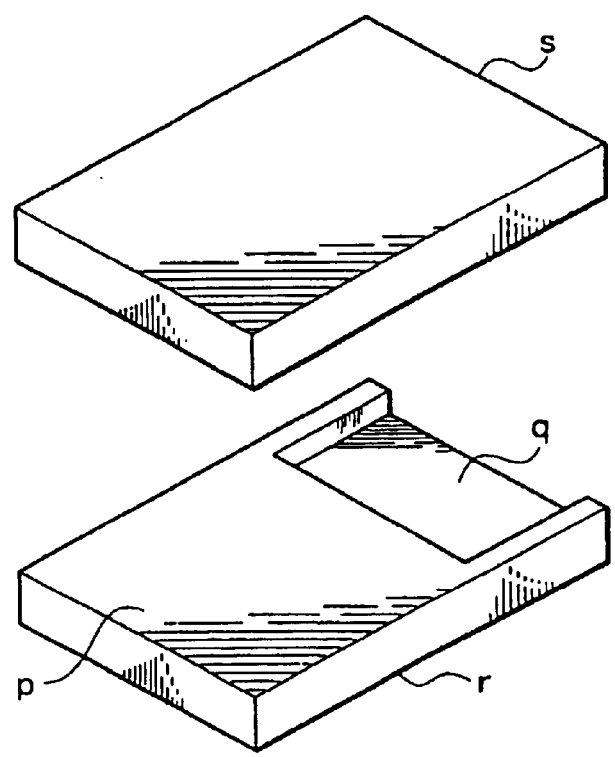
Figure 12A:
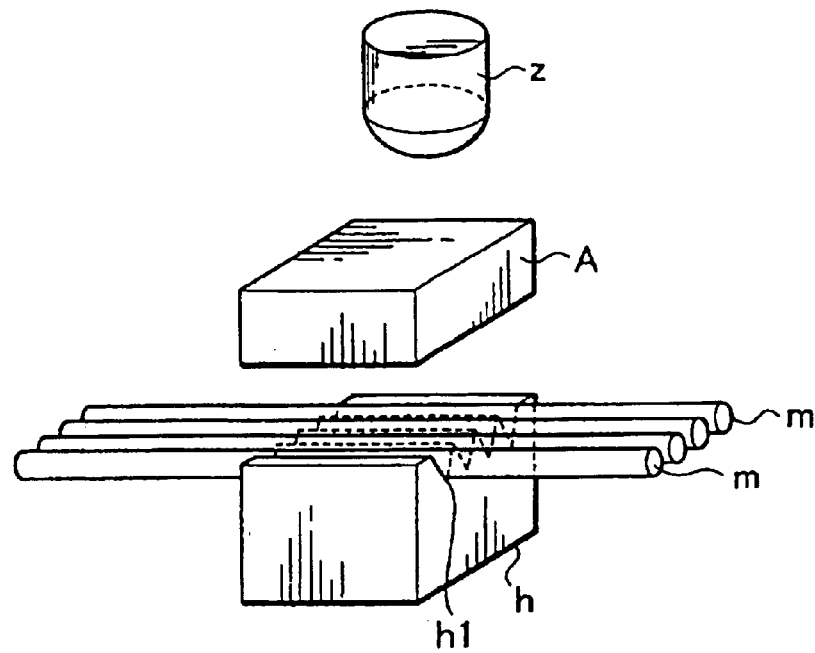
Figure 12B:
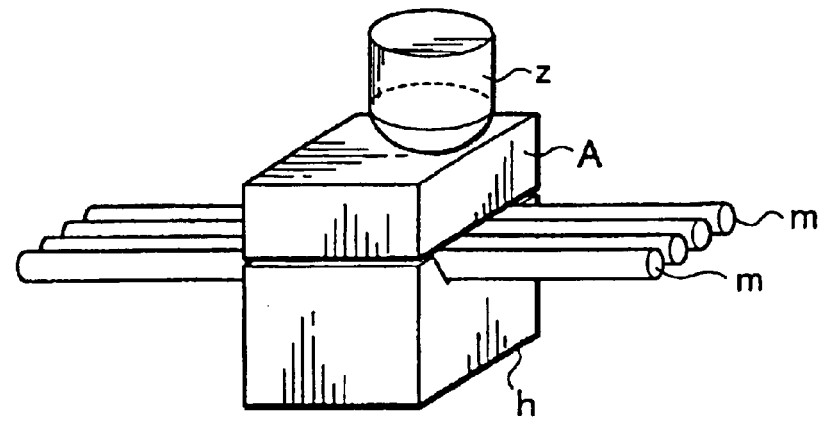
Figure 12C:
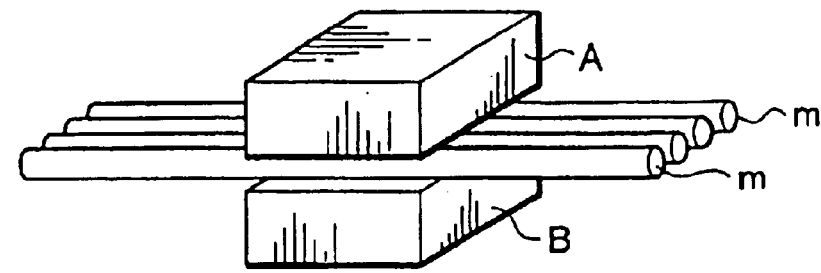
Figure 13:
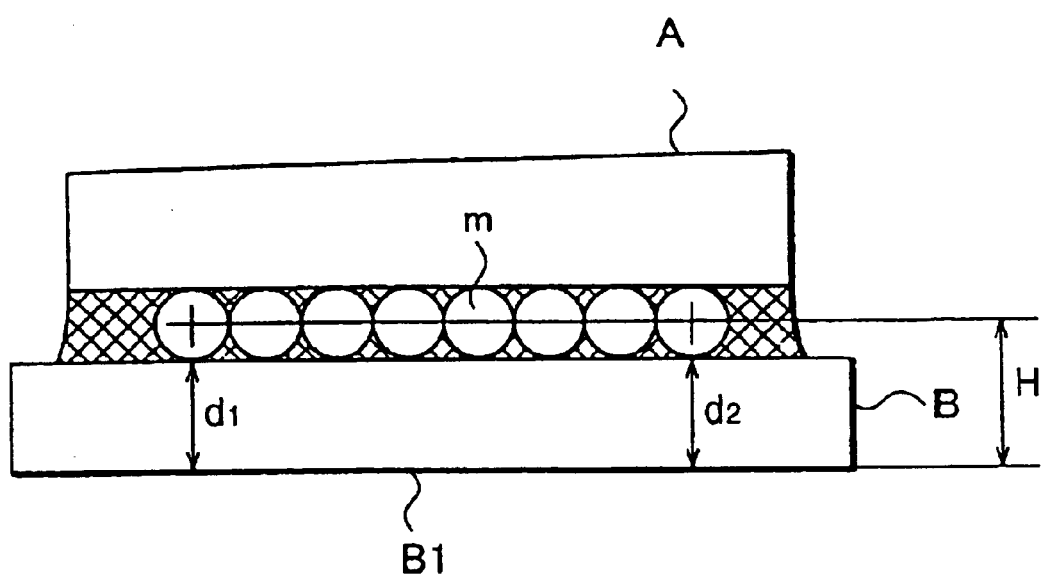
FIG. 13 is an illustration showing an example of bad effect in an optical fiber array according to a conventional example.

Thereafter, in the state the posture and horizontal position of the plate member-B supporting means 12 are maintained, the plate member-B supporting means 12 is made to descend until the height h1 of the vertical-position standard wall surface 16 comes to be 1,000 μm, so that the state shown in FIG. 7B is brought about, in which the plate member-A 2, the plate member-B 1 and the optical-fiber bare fibers 5 have been joined together via the adhesive 6. Here, when the height h1 of the vertical-position standard wall surface 16 is 1,000 μm, the adjustment layer 7, which involves the non-uniformity of ±2 μm in thickness in respect to a thickness center value of 50 μm, is interposed between the outer peripheral top surfaces of the optical-fiber bare fibers 5 and the top surface of the plate member-B 1.

At this stage, the plate member-A 2 and plate member-A supporting means 11 are irradiated by ultraviolet rays to make the latter ultraviolet rays transmitted through the former to cause the adhesive 6 to cure, so that the plate member-A 2, the plate member-B 1 and the optical-fiber bare fibers 5 are integrated. The thickness of the adjustment layer 7 has decreased by 2.5 μm as a result of the cure shrinkage to come to be 48 μm. Then, the preset distance H between the central line of the optical-fiber bare fibers 5 (a straight line formed by connecting cross-sectional central points of the optical-fiber bare fibers 5) and the top surface of the plate member-B 1 (i.e., the disposition standard surface 3) has come to be 1,060.5 μm.

The thickness dimension of the plate member-B 1 varies as shown in FIG. 7, but such variation is cancelled or compensated by the variation of the adjustment layer 7 (in virtue of the flow of the adhesive before curing as described above) interposed between the rows of the optical-fiber bare fibers 5 and the plate member-B 1. Thus, the preset distance H between the rows of the optical-fiber bare fibers 5 and the disposition standard surface 3 in the plate member-B 1 is kept constant at 1,060.5 μm without regard to any spots in the plate member-B 1. The horizontal distance W between the central point of an end cross section of the right-most arbitrary optical-fiber bare fiber 5 and the lateral surface 4 of the plate member-B 1 (see FIG. 7B) is also set to 1,000 μm.

Subsequently, the above steps were repeated but changing the plate member-B 1. The plate member-B 1 used this time was 960 μm in thickness, different from the previous thickness 950 μm. According to entirely the same procedure, the plate member-B supporting means 12 was made to descend until the height h1 of the vertical-position standard wall surface 16 came to be 1,000 μm, so that an adjustment layer 7 of 40 μm in thickness was formed between the outer peripheral top surfaces of the optical-fiber bare fibers 5 and the bottom surface of the plate member-B 1. This adjustment layer 7 came to be 38.4 μm upon cure shrinkage. As the result, the preset distance H between the central line of the optical-fiber bare fibers 5 and the disposition standard surface 3 in the plate member-B 1 came to be 1,060.9 μm, showing a result corresponding with the previous case with high accuracy.

What is claimed is:

1. An optical fiber array comprising a plurality of optic-fiber bare fibers which are disposed in alignment between two opposing plate members and are optically connected to connection elements in an end-to-end facing arrangement with each other, wherein;

the optical-fiber bare fibers are disposed in contact with a flat surface of one plate member A, an adjustment layer formed of an adhesive is interposed between another plate member B and the plate member A, where a flat surface of the plate member B on its side opposite to the adjustment layer serves as a disposition standard surface when the array is set in; and the adjustment layer, which fulfills conditions of (dmax+r)<H where the desired preset distance from i) a central line of the optical-fiber bare fibers which is formed by connecting central points of end cross sections in the optical-fiber bare fibers disposed in alignment ii) the disposition standard surface is represented by H, the maximum value of the thickness dimension in the plate member B by dmax, and the radius of the end cross sections of the respective optical-fiber bare fibers by r, compensates a deviation from the preset distance H that is caused by a non-uniformity in thickness dimension in the plate member B, whereby the distance from the central points of the respective optical-fiber bare fibers to the disposition standard surface is set identical or substantially identical to the preset distance H.

2. The optical fiber array according to claim 1, wherein said adjustment layer comprises a mixture of a resin and an inorganic filler.

3. The optical fiber array according to claim 2, wherein said resin is a cured product of a light-curable resin.

4. The optical fiber array according to any one of claims 1 to 3, wherein the distance from the central points of the respective optical-fiber bare fibers to the disposition standard surface has an accuracy of ±5 μm or less in respect to the desired preset distance H.

5. The optical fiber array according to any one of claims 1 to 3, wherein a horizontal distance W between one lateral surface of at least one of the plate member-A and the plate member-B and the central point of an end cross section of an arbitrary optical-fiber bare fiber has an accuracy of ±5 μm or less in respect to the desire preset value.

6. A method for manufacturing an optical fiber array comprising a plurality of optical-fiber bare fibers which are disposed in alignment between two opposing plate members and are optically connected to connection elements in an end-to-end facing arrangement with each other; the method comprising the steps of:

fixing respective optical-fiber bare fibers held in rows of V grooves of a optical-fiber bare fiber alignment guide, onto a flat surface of a plate member A to form a fixed member consisting of the plate member A and a plurality of optical-fiber bare fibers;

adjusting the posture of at least one of the fixed member and a predetermined standard plane while bringing the respective outer peripheral surfaces of the optical-fiber bare fibers fixed to the flat surface of the plate member A, into contact with the standard plane, to ensure the parallelism between i) a central line of the optical-fiber bare fibers which is formed by connecting central points of end cross sections of the optical-fiber bare fibers in the fixed member and ii) the standard plane, and to set to zero a vertical distance between i) the respective outer peripheral surfaces of the optical-fiber bare fibers kept in contact with the standard plane and ii) the standard plane;

separating the fixed member and the standard plane by a stated distance while maintaining the parallelism between the central line of the optical-fiber bare fibers in the fixed member and the standard plane, and thereafter disposing another plate member B on the standard plane;

making the fixed member and the standard plane close by a stated distance while maintaining the parallelism between the central line of the optical-fiber bare fibers in the fixed member and the standard plane, and thereafter joining the plate member B disposed on the standard plane and the plate member A of the fixed member in the state an adhesive is interposed between them; and curing the adhesive to form an adjustment layer to set the distance from the central points of the respective optical-fiber bare fibers to the disposition standard surface identical or substantially identical to the preset distance H; the adjustment layer fulfilling conditions of (dmax+r)<H where the desired preset distance from the central line of the optical-fiber bare fibers to the standard plane is represented by H, the maximum value of the thickness dimension in the plate member B by dmax, and the radius of the end cross sections of the respective optical-fiber bare fibers by r.

7. The optical fiber array manufacturing method according to claim 6, wherein said optical-fiber bare fiber alignment guide is so disposed that a horizontal distance between a row of the V-grooves and one lateral surface of the plate member A comes to be a stated value, and the respective optical-fiber bare fibers held in the V grooves of this optical-fiber bare fiber alignment guide are fixed onto the flat surface of the plate member A to form the fixed member consisting of the plate member A and the optical-fiber bare fibers.

8. The optical fiber array manufacturing method according to claim 6 or 7, wherein the horizontal distance between one lateral surface of the plate member B disposed on the standard plane and one lateral surface of the plate member A in the fixed member is adjusted to come to be a stated value, then the plate member B and the plate member A of the fixed member are joined in the state the adhesive is interposed between them, and thereafter the adhesive is cured.

* * * * *